[11] 3,589,351

| [72] | Inventors | William E. Shoupp; |
| | | Berthold W. Schumacher, both of |
| | | Pittsburgh, Pa. |
| [21] | Appl. No. | 19,732 |
| [22] | Filed | Mar. 16, 1970 |
| | | Division of Ser. No. 756,653. Aug. 30, 1968, |
| | | Pat. No. 3,556,600. |
| [45] | Patented | June 29, 1971 |
| [73] | Assignee | Westinghouse Electric Corporation |
| | | Pittsburgh, Pa. |

[54] CUTTING OF ROCKS, GLASS AND THE LIKE
5 Claims, 2 Drawing Figs.

[52] U.S. Cl. ................................................. 125/1,
219/121 EB, 299/14
[51] Int. Cl. ....................................................... B28d 1/28,
B23k 15/00, E21c 37/20
[50] Field of Search .......................................... 125/30, 1;
175/16; 219/121; 299/14

[56] References Cited
UNITED STATES PATENTS
| 2,781,754 | 2/1957 | Aitchison | 125/1 |
| 2,866,622 | 12/1958 | Murray | 175/16 X |
| 3,004,137 | 10/1961 | Karlovitz | 175/16 |
| 3,351,731 | 11/1967 | Tanaka | 219/121 |
| 3,393,289 | 7/1968 | Duhamel | 219/121 |

OTHER REFERENCES

"Gravite Softened by Infrared Laser," THE WASHINGTON POST, p. D4, Nov. 24, 1966
NOVEL DRILLING TECHNIQUES by William C. Maurer, p. 84— 86, Pergamon Press 1968

*Primary Examiner*—Harold D. Whitehead
*Attorneys*—A. T. Stratton, C. L. Freedman and John L. Stoughton ABSTRACT: A method is disclosed for drilling holes, or cutting of rock or glass with a corpuscular beam, of electrons or ions of high energy density, typically exceeding about $10^6$ watts per square centimeter. The beam is projected into the atmosphere from the chamber in which it is generated. The surface being impinged by the beam may advantageously be under water. The particles of the beam may also have very high energy (accelerating voltage 1 million to 100 million volts) to produce a blasting effect under the surface of the material being disrupted.

PATENTED JUN 29 1971                                3,589,351

INVENTOR
Berthold W. Schumacher
William E. Shoupp

ATTORNEY

CUTTING OF ROCKS, GLASS AND THE LIKE

BACKGROUND OF THE INVENTION

This is a division of application Ser. No. 756,653 filed Aug. 30, 1968 and relates to the art of cutting or shaping of rocks and related materials such as glass bodies and the like.

The word "rock" as used in this application includes within its scope the hard geologic formations which are commonly recognized as rock or stone and in addition such materials as cement block, Belgian block street paving and the like and also such materials as glass, metal, ceramics and quartz, or ceramic-filled epoxy resin or epoxy resin filled with refractory material such as aluminum oxide.

In accordance with the teachings of the prior art, excavation is also carried out by mechanical cutting and drilling. But the cutting or drilling of rock by mechanical cutters is costly. During the past 20 years means have also been devised to accomplish the same purpose by the use of so-called jet flames. Some kinds of rock are sensitive to thermal stress cracking and they can be broken or weakened by thermal methods. For instance, jet flames can be directed against the face of the rock and, under the thermal stresses, the rock cracks or exhibits spallation, whereby small chips and flakes burst off the heater surface. This is usually the case when some crystalline components of the rock structure undergo a phase transition at a relatively low temperature and where this phase transition is associated by a considerable change in specific volume. The well-known commercial process of this type is the "Linde Jet Piercing" method. This jet piercing method has been found economically attractive for cutting and drilling hard rocks like jasper and taconite. The method has not only found widespread acceptance in this country but also in Russia.

The jet flame which is used for the thermal degrading and breaking of the rock is produced by a mixture with oxygen of various kinds of common fuels like methane, kerosene, or oil. It has been found that a flame burning only with air is not hot enough to accomplish the purpose. It has also been found that certain types of rock withstand the attack of this flame even when the fuel is burned with oxygen.

The above-mentioned jet flame method of cutting rocks is a process where the heat from the flame passes into the rock by heat conduction. The efficiency of the process depends on the heat conductivity of the burned-off or vaporized top layers of the attacked rock. In a situation where, due to the chemical decomposition of the rock at the higher temperatures, reaction products are produced which are good heat insulators, and also opaque to heat radiation from the flame, the jet piercing process loses its efficiency. The insulating and radiation-blocking properties of the reaction products set a natural limit to the heat transfer by any kind of radiative or heat conduction process. These blocking properties also set a limit in the process of piercing rocks by laser pulses which has recently been considered. In this case the plasma produced by the vaporized material from the surface becomes nontransparent, namely a black body, for just the radiation which carries the energy. Further energy transport to lower layers of the treated rock material again depends only on heat conduction and the thermal insulating products of reaction militate against conduction.

SUMMARY OF THE INVENTION

This invention arises from the realization that energy transfer to a solid body can be accomplished without recourse to heat transfer, if this solid body is bombarded by corpuscular particles. Electron beams or ion beams can serve two purposes, (a) heat and disintegrate rocks on a thermal basis by supplying disintegrating energy by an electron beam or ion beam, and (b) degrade the rock on the basis of what may be called radiation chemical processes, breaking up the molecular structure of the rock material by the corpuscular bombardment.

In accordance with this invention a method is provided for cutting or shaping rock or glass pieces by impinging on the surface thereof a high energy density corpuscular beam from apparatus for producing and emitting such a beam into the atmosphere. Typically, the beam may be an electron beam having an energy concentration exceeding $10^6$ watts per square centimeter and particle energies of the order of 100 Kv. to 500 Kv. Such a beam may be produced with the apparatus shown in Schopper-Schumacher U.S. Pat. No. 2,899,556 granted Aug. 11, 1959 or in application Ser. No. 549,863 or in application Ser. No. 549,863 filed May 13, 1966 to Harold C. Simon and Bernard Gerber for Power Supply Apparatus, now U.S. Pat. No. 3,418,526 dated Dec. 24, 1968. The Schopper patent and the Simon application are incorporated herein by reference. A beam in which the particles have very much higher energy, having been accelerated by 1 million to 100 million volts, may also be used with advantage. To produce such a beam the Marx generator, Van de Graff generator, the Betatron or the Dynamitron may be used.

Typically an electron beam of high power as well as high power density is directed against the surface of the piece to be shaped. The high kinetic energy of the electrons causes them to penetrate the piece and impart their energy to the atoms and molecules thereof. This causes an extremely high, localized heating, with subsequent melting or even sublimation and vaporization of the material. Such vaporization takes place especially along the axis of the beam, as long as the beam stays confined or, in other words as long as the beam power density is not too far reduced due to scattering in the vapor, or due to initial beam spread. A low angular aperture, about ½° to 5°, of the beam is therefore as desirable for our purpose as a high power density.

This invention is based partly on the realization that in materials of low atomic number, like rock, glass or water, beam scattering is slight and in most cases heat conduction is low, hence the beam readily produces a super heated vapor channel along its path. This results in beam penetration into water, rock or glass which goes much deeper than, for instance, in metals (assuming equal beam power).

As a result of the above the major part of the beam energy is deposited at the bottom of this vapor channel which means at a depth of several inches below the rock surface at high power densities. Yet even here the before-mentioned advantage of particle penetration rather than heat conduction producing the energy transfer is maintained and effective. Finally, in this process the material is removed from the impact area of the electron beam by boiling away of liquid drops or by vaporization, and in the course of this process the electron beam drills a deeper and deeper hole for itself. If now the electron beam is moved across the surface of the rock a cutting action can be accomplished as well.

In the practice of this invention the high-power, high density corpuscular beam may also be used to cut a mass or slab of rock into sections. The process according to this invention has been found to be highly effective and successful by applying the high-power electron beams, with a total energy of 5 to 10 Kw. to various specimens of rock and concrete. For instance, the 5 Kw. beam has cut through a 1 inch-thick slab of concrete at a speed of approximately 6 inches per minute. If the piece is thicker than 1 inch a clean cut is not accomplished with the 5 Kw. beam, but a piece several inches thick can be broken readily along the cutting line of the electron beam although penetration may only be 1 inch.

While cutting at higher speeds it was observed in the case of concrete that a glassy melt was produced which resolidified into a glassy hard substance when the electron beam had passed on, and which kept the "cut" pieces still together although they could be broken apart by a slight force. It is desirable to avoid this glassy resolidification.

In addition, it has been observed while cutting concrete, sandstone and granite with the electron beam, especially when using powers of 8 to 10 Kw., that liquid masses, similar to lava, are formed and produce at times foam and bubbles, on the surface of the rock, just underneath the nozzle of the electron gun. The exit nozzle of the electron gun is a small distance from the surface of the rock, typically at a distance of about one-eighth to one-fourth inch, this foamy material sticks between the electron gun and the rock interfering with the free movement of the electron gun. Another difficulty was observed when cutting marble. In this case there is no liquid phase but clouds of dust are emitted from the area where the electron beam impinges on the marble. Although a protective gas flow emerges from the exit nozzle of the electron gun some of this dust, probably expelled with high velocity from the impact area, enters the electron gun and penetrates into the electron beam acceleration chamber; there it causes arcs and sparks shutting off the electron gun.

These difficulties can be avoided by cutting the rock under water or by blasting away the molten material or the dust with a jet of water, steam or gas.

As indicated an ion beam canbe used in place of an electron beam. The advantage of an ion beam is the reduced rate of X-ray production even for a high-power beam. It is feasible to cut rocks with an ion gun, equipped with beam transfer stages to atmospheric pressure, without an X-ray-shielding enclosure; a relatively light lead-rubber apron for the operator is all the shielding that is required. This is of great practical and economical advantage for a fieldmobile rock cutting beam gun.

In all the following discussions it shall be understood that the terms electron gun also implies the possible use of ion guns.

FURTHER ELABORATION ON THE INVENTION

In arriving at this invention it has been realized that the energy interaction of the rock and the corpuscular beam is different from, and has none of the limitations of, the energy input by thermal radiation or the physical effects of explosion. Thermal energy interacting with the surface of a rock results in the giving off of vapors of the decomposition products, for instance water vapor from absorbed or absorbed water, or produced by the release of chemically bound water, so-called *crystal water*. If this vaporization is heavy it produces blast action, and a flame, or other heater, would be diverted from its original direction; if the vapor is mixed with dust and particles preventing the passage of light, or if thermal radiation, the vapor forms an effective barrier protecting the underlying rock layers from further heat input from the flame or from thermal radiation. This is not the case if the energy input is supplied by an electron or ion beam. The particle beam transmits its energy to the matter on which it impinges in proportion to the area density of this matter, expressed for instance in grams per square centimeter. It does not matter whether this matter is a gas, or a vapor, or a solid. If the particle or corpuscular beam passes through the aforementioned vapor layer emitted from the surface of the rock it only loses a small fraction of its energy in this vapor zone; the preponderance energy still impinges on the underlying solid. The penetration of the particles into the solid matter is a process entirely unrelated to heat conduction or explosion. The process of energy penetration can proceed faster than it could if the energy had to be transmitted on the basis of heat conduction. It does not matter either whether or not the heat conduction parameters change in the process of vaporization. Any hydrodynamic action produced by the vapor, effecting, for instance, the above-mentioned flame, has no effect in case of energy input by means of corpuscular beams. The speed of the corpuscles in an electron or ion beam is so high that aerodynamic effects like turbulence of the vapor, do not affect the beam or the energy flux in the beam. In fact the vapor, particularly that due to the water frequently present in the rock, concrete or other material, appears, upon its violent exit from the area of bombardment, to assist in removing the heavier components of the cutting volume and it greatly assists in the process.

The thermal properties of the rock material have little influence on the thermal input, and therefore on the melting and vaporization process produced by a corpuscular beam. The melting temperature required partly determines the overall power needed for a certain cutting speed. The corpuscular beam, since it is not affected by hydrodynamic phenomena, can maintain a much higher power density than for instance a jet flame. It can therefore vaporize any kind of rock and drill itself into the rock simply on the basis of vaporization alone.

This favorable behavior of corpuscular beams in comparison with flames also holds if the source of the vapor which may prevent heating by flames is not due to the chemical decomposition position of the rock alone but, for instance, to the presence of water coming into the drilling zone from the outside. While a water layer may prevent heat input of sufficient magnitude from a jet flame it does not do so in the case of an electron beam, the power density in an electron or ion beam being high enough to vaporize any water flowing into the interaction zone. It is possible, in the practice of this invention, to cut and drill rocks which have so far withstood any conventional drilling by the jet piercing method using the oxygen jet flame.

It is emphasized that with the corpuscular beam reliance is not placed alone or even predominately on heat conduction or heat transfer in disintegrating the rock. The electrons or ions penetrate and impart energy to the rock regardless of the thermal conductivity of the rock itself, or of any surface layer which may be formed by the decomposition products. An electron beam can be, and has been, successfully used for what may be called a "melt cut." The rock is sliced by melting a narrow and deep slit into it by means of the electron beam. Typically, such a cut is 2 inches deep and one-eighth to three-eighths inch wide. While the melt cutting technique works in every kind of rock, soft or hard, there are special kinds of rock which also exhibit thermal stress cracking. In this case, electron beams which are used customarily have a beam voltage of 150 Kv., and serve first to drill a hole or slot by melt cutting from the surface down, thereby transporting energy slowly deeper and deeper below the surface level of the rock face. The heat applied to and through the wall of the hole or slot leads finally to large scale thermal stress cracking of even large blocks of rock.

The electron beam cutting is more efficient than flame cutting because the cuts can be made narrower; it is uneconomical to melt large volumes of rock in the disintegration process. With two deep narrow cuts at an angle to one another large blocks of material can be cut out of a rock face, and only a fraction of this volume of rock needs to be melted.

It is a property of an electron beam that when this beam impinges on an absorber, the electrons of the beam lose their energy over a penetration distance which depends on the absorber. This distance is called the range. The maximum amount of energy released per unit volume does not take place at the surface of the absorber but at a depth of between one-third to two-thirds of the range. The energy is distributed in depth in accordance with what is called the depth dose or energy release function. The higher the accelerating voltage of the electron beam, that is, the kinetic energy of the electrons in the beam, the deeper below the surface of the absorber is the peak of this energy release function. For 150 Kv. beams, the peak of the energy release function is about 2 to $3\times10^{-2}$ gms./cm.$^2$ below the surface. For electron beams of 5 to 50 million volts it is at a depth of 2 to 10 gms./cm$^2$ corresponding to a linear depth of 0.2 to 0.6 cm.

The depth is expressed above in grams per square centimeters (gm./cm.$^2$) to take into consideration the density of the absorber. The data given in gm./cm.$^2$ above is the depth of penetration multiplied by the density; that is, depth in cm.$\times$gm./cm. =depth in gm./cm.$^2$.

In the practice of this invention a rock or glass body or the like can be cut into sections. This cutting is most effectively carried out under water with apparatus capable of projecting high-power concentrated electron beam. The beam outlet nozzle of the apparatus is spaced about one-eighth inch to one-half inch from the surface of the glass body. To produce a cut the glass is moved relative to the beam at the rate of 10 to 60 inches per minute.

With the body, for example a pane, preheated, the body can be cut in air but a rounded bead is produced at the cut.

BRIEF DESCRIPTION OF DRAWINGS

For a better understanding of this invention both as to its organization and as to its method of operation, together with additional objects thereof, reference is made to the following description, taken in connection with the accompanying drawings, in which.

DESCRIPTION OF APPARATUS

Figure 1:
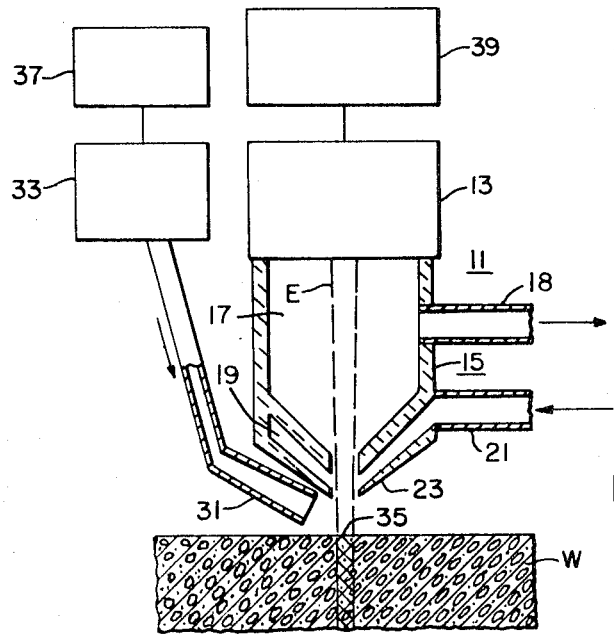
FIG. 1 is a view in transverse section, but in certain respects diagrammatic, of apparatus for practicing this invention in which the molten material, lava, fumes and dust generated during a cut, are blasted away.

FIG. 1 shows apparatus for producing an electron beam E in the atmosphere. This apparatus includes an electron beam gun 11 having a stage 13 in which the electron beam E is generated and the conventional end-stage 15, as disclosed in the above-mentioned Schopper patent, through which the beam E is brought into the atmosphere through differentially pumped intermediate chambers. One of the chambers 17 is shown pumped through a tube 18. Before the beam E enters the atmosphere it passes through a chamber 19 through which gas at higher than atmospheric pressure is fed through a tube 21. The gas and beam E emerge through the nozzle 23. The beam E impinges on the work W to be cut which may be a rock or glass or the like.

Where the cutting is carried out under water the pressure in chamber 19 prevents the water from penetrating into the interior of the gun. The pressure of the gas supplied through tube 21 may be set sufficiently high to overcome the water pressure if the cutting is taking place at a substantial depth under the water.

The apparatus shown in FIG. 1 also includes an additional nozzle 31 which is mounted under the beam outlet nozzle 23 between this nozzle and the work W. The nozzle 31 is desirable when the apparatus is used to cut rock as disclosed in our parent application and is connected to a fluid supply 33 from which it derives a fluid such as water, steam or gas. A high-pressure jet of this fluid is projected laterally on the zone of reaction 35 of the beam E and work W, blasting away the molten rock or lava, the pulverized material and fumes formed during the cutting. The clogging of the nozzle 23 and the penetration of these products of the reaction into the gun 11 is thus prevented. The molten material is blown away by the hydrodynamic forces exerted by the fluid jet and the cutting action is improved. The jet prevents resolidification of the rock material in a glassy state. Since the gas jet is blowing at nearly a right angle to the electron beam E it also prevents spattered material from the rock from reaching the electron gun nozzle 23.

To achieve the variety of beam jet action described above, the jet from the nozzle 31 is controlled by a jet control 37 and the electron beam E is controlled by an electron beam control 39. The controls 37 and 39 can be set so that the jet and the beam are supplied continuously or intermittently or in the case of the jet, the fluid material is changed from gas to water or vice versa. Typically the beam and jet may be supplied during alternate intermittent intervals. The intervals during which the beam E is supplied are long enough to produce a substantial cut in the work W and the interval during which the jet is supplied is long enough to blast away the products of the reaction. These intermittent intervals may overlap. Alternatively, the beam may be intermittent and the jet continuous. In this case the beam pulses should be of long enough duration to produce substantial cuts. The duration between pulses should be long enough to assure blasting away of the products of the reaction before each new cut. The jet may be intermittent and the beam E continuous. In this case the jet pulses should occur frequently enough and persist long enough to blast away the products of reaction so that they do not clog the nozzle 23 and penetrate into the gun 11. Substantial quantities of these products should not be permitted to build up.

It is desirable to maintain the density of the gas between the beam outlet nozzle of the beam generating apparatus low or the gas attenuated. The gas is heated by the electron beam and its density is thereby reduced. But the gas volume traversed by the electron beam is very small and constantly replaced by turbulent gas motion; therefore the overall effect is small. To materially improve the attenuation it is desirable to heat this gas with a flame or flame arc. The flame does not need to have a total energy which even remotely approaches the energy in the electron beam. Since the heat capacity of the gas is low the total energy needed for heating it, even to very high temperatures, is not great. With a modern plasma torch as they are used for cutting of metals, one can reach gas temperatures in the order of 6000° K. This corresponds to a reduction in the gas density of one-twentieth, and consequently a reduction of the energy and scatter losses in the electron beam by one-twentieth. The working distance between the electron gun and work piece can thus be increased to distances of the order of 1 inch. As an additional effect, the hotter gas produces a lower flow rate into the differentially pumped chambers 19 of the electron gun, thereby reducing the requirements on the pumping capacity.

To combine a flame or plasma with the electron beam is not just a matter of adding the power available from both devices. Typically a flame can impart heat to a workpiece W only by way of heat conduction. This is a somewhat slow and limited process. In contrast an electron beam imparts energy to the workpiece W by way of electron penetration into as much as 1,000 atomic layers, without relying on any conduction or diffusion process. There is also a characteristic difference between the energy input per unit area, or rather the energy flux per unit area which can be achieved with an electron beam and, by comparison, with a flame. The energy flux density of an electron beam is many orders of magnitude higher than the energy flux density in even the hottest plasma torch. A flame is also affected by the processes going on the surface of the workpiece at which it is directed. Not so an electron beam. The electrons are not stopped by either vapor or dust clouds emerging from the workpiece surface. While the heat available from a plasma flame is beneficial to the cutting processes it should nevertheless be kept in mind that the main purpose of the flame is to achieve a greater working distance.

A flame to attenuate the gas, produced by burning methane ($CH_4$), acetylene $C_2H_2$, hydrogen or other combustible materials with air or oxygen, can be emitter through jet 31 of the apparatus shown in FIG. 1 or through an additional jet (not shown) provided for this purpose. Such a jet could have the usual multiannular structure typical of acetylene torches. The flame can also be derived by supplying the combustible gas and the oxygen through annular spaces surrounding the end stage 15 of FIG. 1. In this case the combustible fuel is supplied through an inner ring and the oxygen through an outer ring.

Figure 2:
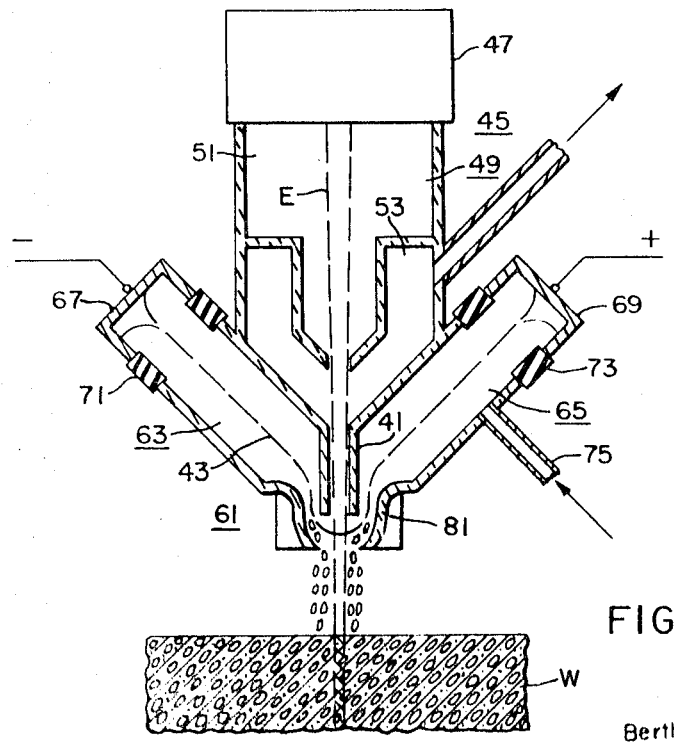
FIG. 2 is a like view of apparatus for practicing this invention in which the gas in the region between the outlet nozzle of the apparatus and the material being cut is attenuated by a plasma arc.

FIG. 2 shows apparatus in which the gas between the beam outlet nozzle 41 of the apparatus and the work W is attenuated by a plasma flame or plasma jet 43. The plasma jet 43 is produced by apparatus analogous to the Y-plasma torch which is presently being sold by Thermal Dynamics Corporation of Hanover, New Hampshire.

The apparatus shown in FIG. 2 includes a gun 45 having a stage 47 in which the electron beam E is generated and an end stage 49 through which the beam E is brought into the atmosphere through differentially pumped chambers 51 and 53.

The apparatus includes a Y-shaped plasma generator 61. The torch has hollow arms 63 and 65 terminating in electrodes 67 and 69 respectively between which an arc-producing potential is applied. The electrodes 67 and 69 are insulated from the remainder of the corresponding arms 63 and 65 by rings 71 and 73. A suitable gas under pressure exceeding atmospheric pressure is supplied to arm 65 through a conductor 75. Gas may also be supplied through arm 63. The gas may be inert, for example helium or argon, or nitrogen, or mixtures of these gases with other gases, for example argon and hydrogen. The arms 63 and 65 are sealed to the chamber 53 and form part of this chamber.

The stem 81 of the generator 61, which is usually water cooled, is coaxial with the nozzle 41 and may in fact be the nozzle. The beam E passes through the center of the stem 81 and thus through the plasma 43.

In the use of this apparatus an arc is fired between the electrodes 67 and 69 and its plasma is projected through the stem 81 which serves to constrict the arc. The beam exit nozzle 41 of the gun 45 projects into the stem 81. The electron beam E emerges through the stem 81 coaxially with the plasma 43. The plasma heats the gas between the nozzle 41 and the work W and permits the nozzle to be spaced substantially from the work W because of the reduced density of the hot gas.

EXAMPLE I

An electron beam of 140 to 150 Kv., 5Kw. was directed against (1) a concrete slab, (2) a stone of concrete plus coarse gravel, and (3) against a sandstone ("Belgian stone"). The pieces were placed on a rotating specimen table and rotated so that the beam spot traveled across the stone at a speed of 4 to 7 inches per minute; at some points the movement was stopped and then restarted.

A circular cut about 1 inch deep was made in the concrete at 7 inches per minute. At the cut glassy resolidification took place but with a slight force the concrete broke along the circular cut. The conglomerate concrete behaved similarly. A glassy melt formed with some bubbling over the path of the cut. The Belgian stone cracked in many places under the thermal stress, in addition to showing a circular cut. A glass melt partly green and partly colorless flowed out of the cut at the ends. Leaving the beam stationary for about one-half minute caused a cavity to develop about 3 inches deep and three-fourths inch diameter.

EXAMPLE II

A block of sandstone 3¼ inches ×4 inches ×12 inches was placed under a gun with the exit nozzle of the gun about one-fourth inch from the surface of the block. The gun was operated at a power of 9 Kw. with the acceleration voltage of 145 Kv. and the gas through the exit nozzle helium at 180 cubic feet per hour. The travel of the block was 4 inches per minute.

I. A cut 2½ inches deep (along the travel) was produced when affluent "lava" stopped further movement.

II. A cut 1¼ inches deep was produced but the break occurred to a depth of 1⅝ inches and across the whole width of the rock (12 inches).

III. A slab 1⅜154 inches thick shows a crack line over half the length of the block (6 inches). With a chisel and slight pounding a slab 1⅝ inches thick lifts clearly off the block along the full length and width of the block.

EXAMPLE III

A block of granite 3½ inches ×5 inches ×8 inches was placed under a gun with the exit nozzle about one-eighth inch from the surface of the granite. The gun was operated with the parameters of example II with the gun and block stationary. After 20 seconds of operation the block cracked through. "Lava" issued from the top of the block but caused no interference with the gun. The melt cavity was about 3½ inches deep and five-eighths inch diameter.

EXAMPLE IV

A concrete slab 1⅞ inches x 4 inches x 5 inches was placed on another slab under a gun with the exit nozzle three-eighths inch from the surface of the work. The gun parameters were as in example II. A cut was made to a depth of 2 inches with the slabs moving at 4 inches per minute. A cut was produced which was five-sixteenths inch wide on top and three-eighths inch wide at 1 inch level below the top. The cut passed through the top slab; burn marks were visible on the support slab. There was much moisture on the support slab. There was "lava" flowing at the start of the cut but not at the end.

Example V

A limestone block 3½ inches ×5 inches ×12 inches was cut with apparatus operated at the parameters of example II. At the start the beam was one-half inch inside of the edge of the block. The beam outlet nozzle was three-eighths inch from the surface of the block. The cutting was at the rate of 4 inches per minute. No "lava" flowed out in front or on top of the cut. The cut appeared clean; only a few, insufficient thermal cracks appeared. The cut was 2 1/16 inches deep and three-sixteenths inches wide.

EXAMPLE VI

A granite block as in example III was placed under water. The surface was about 1 inch under the water level surface. The electron gun nozzle was dipped into the water to within one-eighth inch of the rock surface.

With 9 Kw. at 140 Kv. with a cutting speed of about 1 inch/min. the rock was cut as was a similar block before (in air) but no glass flowed out of the cutting slot. A large part of the block crumbled due to thermal stress cracking.

EXAMPLE VII

A glass pane about one-eighth inch thick was submerged under water. An electron beam generator having a rating of about 5 Kw. was held with its beam-outlet nozzle under water about one-eighth inch to one-half inch from the pane. The pane was moved at between 10 inches and 60 inches per minute. A clean sharp cut of the pane was produced.

While preferred embodiments of this invention have been disclosed herein many modifications thereof are feasible. This invention then is not to be limited except insofar as is necessitated by the spirit of the prior art.

We claim:

1. The method of cutting a sheet like rock body having a pair of spaced surface portions between which the cut is to be made which comprises the steps of placing a water layer against said surface portions, of directing a corpuscular beam of high energy content per unit area at one of said pair of surface portions, said energy content being of sufficient magnitude to form a slot in said body extending between said surface portions, and of relatively moving said body and said beam to elongate said slot.

2. The method of claim 1 which includes the step of blowing a jet of fluid against said one surface portion and into said slot to remove the material heated by said beam.

3. The method of claim 1 in which said body comprises a pane of glass, said beam having an energy concentrations of about $10^6$ watts per square centimeter, and the relative speed of the pane and beam is about 10 to 60 inches per minute.

4. The method of cutting a glass pane which comprises submerging said pane under water, setting apparatus for producing a corpuscular beam having a high energy content per unit area in beam-impingement relationship with the surface of said pane while said pane is submerged, energizing said apparatus to produce said beam, projecting said beam on said surface, and while said beam impinges on said surface moving said pane and beam one relative to the other to cut said pane.

5. The method of claim 4 wherein the beam is an electron beam having an energy concentration of about $10^6$ watts per square centimeter, the beam outlet nozzle of the apparatus is held about one-eighth inch to 1 inch from the surface, and the relative speed of the pane and beam is about 10 to 60 inches per minute.